(12) United States Patent
Sugiyama et al.

(10) Patent No.: US 6,768,570 B2
(45) Date of Patent: Jul. 27, 2004

(54) OPTICAL MODULATOR

(75) Inventors: Masaki Sugiyama, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/369,755

(22) Filed: Feb. 21, 2003

(65) Prior Publication Data
US 2003/0231369 A1 Dec. 18, 2003

(30) Foreign Application Priority Data
Jun. 14, 2002 (JP) ........................................ 2002-173980

(51) Int. Cl.[7] .............................................. G02B 26/00
(52) U.S. Cl. ...................... 359/237; 359/245; 359/278; 359/322; 385/2; 385/8
(58) Field of Search ................................. 359/237, 238, 359/245, 248, 254, 278, 322; 385/2, 8, 3, 1, 4, 9, 14, 15, 16, 24, 27, 31, 39, 40, 41, 130, 131, 132; 372/12, 16, 27, 28

(56) References Cited

U.S. PATENT DOCUMENTS

| 6,033,126 A | * | 3/2000 | Omori et al. ................. 385/88 |
| 6,580,843 B2 | * | 6/2003 | Doi et al. ..................... 385/14 |
| 6,584,240 B2 | * | 6/2003 | Doi et al. ..................... 385/2 |
| 2003/0053730 A1 | * | 3/2003 | Seino ............................ 385/2 |

* cited by examiner

*Primary Examiner*—Hung Xuan Dung
*Assistant Examiner*—Tuyen Tra
(74) *Attorney, Agent, or Firm*—Staas & Halsey LLP

(57) ABSTRACT

Desired characteristic impedance can be obtained in an optical modulator. The optical modulator includes a substrate having the electrooptic effect; an optical waveguide formed on a surface of the substrate; and a signal electrode and a ground electrode formed in the vicinity of the optical waveguide, wherein the signal electrode and the ground electrode include an interaction portion and an extraction portion, and a groove is formed between the signal electrode and the ground electrode located in the extraction portion area.

5 Claims, 6 Drawing Sheets

FIG.1
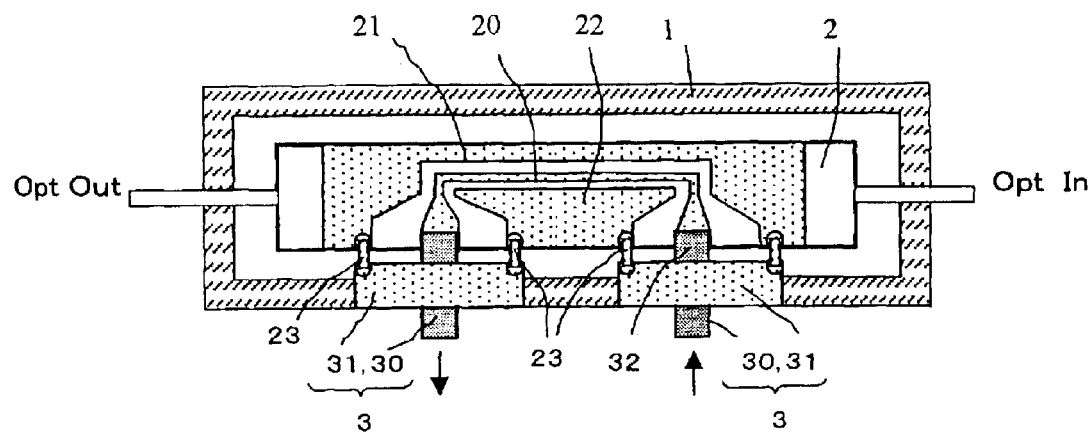
FIG. 2A
FIG. 2B  FIG. 2C
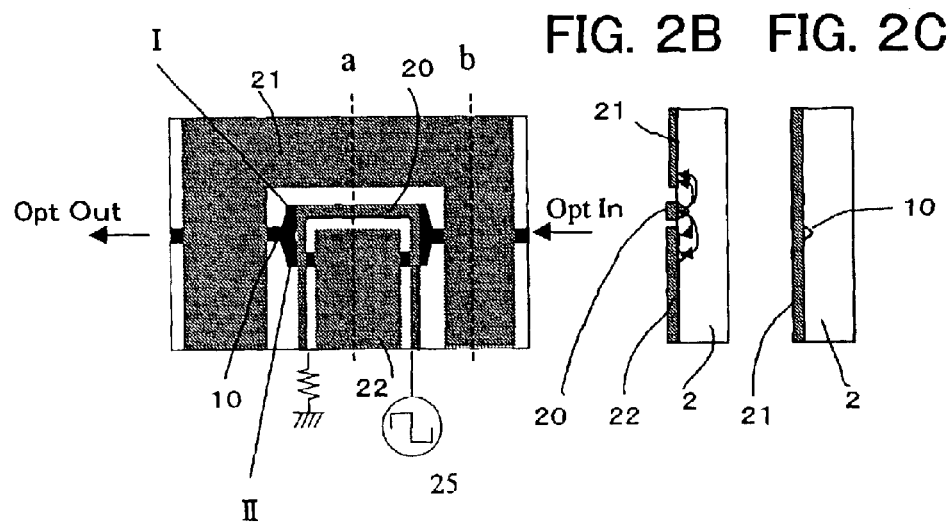

50 Ω Matching Condition

OPTICAL MODULATOR

FIELD OF THE INVENTION

The present invention relates to an optical modulator in which an element varying optical phase using the electrooptic effect is housed.

BACKGROUND OF THE INVENTION

An optical communication system has been applied for a large capacity broadband communication system. With increased demand for larger communication capacity, transmission at higher bit rate is required in such an optical communication system.

Meanwhile, an optical modulator is employed in the optical communication system. An element varying optical phase using the electrooptic effect is housed in the optical modulator, by which a refractive index is changed when electric field is applied on a ferroelectric crystal, etc.

Such an element varying the optical phase by the electrooptic effect (electrooptic effect element) to be housed in the optical modulator is provided with an optical waveguide formed on a wafer cut but of an electrooptic crystal of $LiNbO_3$, $LiTaO_2$, etc. with a metallic film of Ti, etc. produced thereon through patterning and thermal diffusion or proton exchange in benzoic acid by the IC production technique. Further a required electrode is formed in the vicinity of the optical waveguide.

The optical modulator has such a configuration that an optical signal is supplied from outside the electrooptic effect element to the optical waveguide, and that a high-frequency modulation signal of a microwave band is supplied to an electrode which is formed in the vicinity of the optical waveguide.

FIG. 1 shows one configuration example of the optical modulator, in which a top plan view of the uncovered optical modulator is illustrated. An electrooptic effect element 2 is housed in a shielding case 1. FIGS. 2A through 2C are the schematic configuration diagrams of electrooptic effect element 2.

To function as an optical modulator, an exemplary optical waveguide 10 formed on electrooptic effect element 2 is made to branch into two parallel waveguides I and II, which constitute a Mach-Zehnder waveguide, as schematically shown in FIG. 2A. FIG. 2B is a cross-sectional view along line 'a' in the plan view shown in FIG. 2A. Also FIG. 2C is a cross-sectional view along line 'b'.

As an example, when using a Z-cut wafer for electrooptic effect element 2 cut out from an $LiNbO_3$ crystal in the Z-axis direction, constituting an electrode of a single electrode, and applying a modulation scheme of the intensity modulation, a signal electrode 20 is disposed right on top of either one of the parallel branch waveguides I, II (optical waveguide I in the case of FIG. 2 A), while a ground electrode 22 is disposed right on top of the other optical waveguide (optical waveguide II in FIG. 2A).

In addition, there is provided a buffer layer of 0.2–1 μm in thickness constituted of $SiO_2$, etc. between the substrate and signal electrode 20, as well as between the substrate and ground electrode 22, so that the optical signal traveling in the two parallel waveguides I, II is prevented from being absorbed by signal electrode 20 and ground electrode 22.

In FIG. 2A, an optical signal is input to an incident side (Opt In) of waveguide 10. To function as an optical modulator, a rectangular microwave signal output from a signal source 25 is supplied to signal electrode 20 as a modulation signal in the same direction as the traveling direction of the optical signal.

Accordingly, the refractive indexes of branching optical waveguides disposed in parallel are varied corresponding to the polarity of the microwave signal, such as +Δna and −Δnb, respectively. This produces a varied optical phase difference between the phases in the parallel optical waveguides I, II. An intensity modulated optical signal is then output from an output side (Opt Out) shown in FIG. 2A of optical waveguide 10.

Further, by altering the electrode section form, it becomes possible to control an effective refractive index caused by the microwave and match the velocities of the optical signal and the microwave, thus obtaining a wideband optical response characteristic.

Here, in the configuration of the optical modulator shown in FIG. 1, a high-frequency microwave signal as the modulation signal supplied from signal source 25 is supplied to the space between signal electrode 20 and ground electrodes 21, 22 through an RF connector 3. RF connector 3 is provided with a center conductor 30 and an external conductor 31.

Center conductor 30 of RF connector 3 is inserted into a sliding contact member 32 and is connected to signal electrode 20 of electrooptic effect element 2 and to sliding contact member 32 by means of bonding. Also external conductor 31 of RF connector 3 is connected to ground electrodes 21, 22 of electrooptic effect element 2 by means of wire bonding 23.

In such a way, in the input portion of a high-frequency microwave signal, there are provided an interaction portion in which signal electrode 20 and ground electrodes 21, 22 are disposed in parallel, and an extraction portion. A pad is formed on one end side of the extraction portion in which the electrode is widened.

A high-frequency signal input from the pad travels in the interaction portion through the extraction portion. The signal is output from another pad through the extraction portion of the output side, and thereafter the output signal is terminated.

In this configuration, in order to input a high-frequency signal efficiently by preventing the reflection of the microwave (traveling to the inside of the substrate of electrooptic effect element 2), it is necessary to set the characteristic impedance of the extraction portion including the pads as 50 Ω. For this purpose, conventionally, the gaps between signal electrode 20 and ground electrodes 21, 22 in the extraction portion have been widened.

However, there has been a problem that when the aforementioned gaps are widened, the transmission characteristic becomes deteriorated because of an increase in a radiation component as a result of the diffused electric field between signal electrode 20 and ground electrodes 21, 22.

Namely, in the optical modulator of conventional configuration, when a high-frequency signal wavelength is sufficiently long compared to the electrode size of electrooptic effect element 2, the transmission characteristic is not largely affected. However, the problem mentioned below has been recognized when the wavelength becomes short. In this case, the high-frequency characteristic of electrooptic effect element 2 is affected and, as a result, wideband transmission characteristic cannot be achieved.

FIG. 3 shows the high-frequency characteristic of the conventional optical modulator. In FIG. 3, RF signal frequency is shown in the horizontal axis, while attenuation S21 of the optical signal traveling from the input side toward the output side is shown in the vertical axis. It is understood that, at the increased RF signal frequency in the vicinity of 36 GHz, a large dip is produced in the attenuation characteristic, instead of the attenuation being produced linearly. From this existence of the dip in the attenuation, it is to be understood that the wideband transmission characteristic is impeded.

Until recently, the cause of this attenuation dip in the transmission characteristic has not been investigated, and the inventor of the present invention has been studied to investigate this issue.

As a result of the study, the inventor of the present invention has found out the cause that, when the frequency of the microwave modulation signal becomes high, the radiation component of the microwave into electrooptic effect element 2 becomes increased, thus producing the coupling with the electric field which is formed between signal electrode 20 and ground electrode 21.

SUMMARY OF THE INVENTION

Accordingly, it is an object of the present invention to provide a configuration of the optical modulator by which wideband characteristic can be obtained while maintaining a characteristic impedance based on the investigation result of the cause of the attenuation dip mentioned above.

As a first embodiment of the optical modulator to solve the aforementioned problem of the present invention, an optical modulator includes a substrate having the electrooptic effect, an optical waveguide formed on a surface of the substrate, and a signal electrode and a ground electrode formed in the vicinity of the optical waveguide. The signal electrode and the ground electrode include an interaction portion and an extraction portion, and a groove is formed between the signal electrode and the ground electrode located in the extraction portion area.

As a second embodiment of the optical modulator to solve the aforementioned problem, in the above-mentioned first embodiment, the extraction portion has a pad connecting to an electrode of an RF connector through which a high frequency signal is supplied, and the groove to be formed between the signal electrode and the ground electrode located in the extraction portion area is formed in the extraction portion area excluding the pad.

As a third embodiment of the optical modulator to solve the aforementioned problem, in the aforementioned first or second embodiment, the groove is formed between the signal electrode and the ground electrode located only in the extraction portion area of the input side of the optical waveguide.

As a fourth embodiment of the optical modulator to solve the aforementioned problem, in the aforementioned second embodiment, a gap between the signal electrode and the ground electrode located in the extraction area excluding the pad is set as 60 $\mu$m or narrower.

Further scopes and features of the present invention will become more apparent by the following description of the embodiments with the accompanied drawings.

BRIEF DESCRIPTION OF THE DRAWINGS

FIG. 1 shows a typical configuration example of an optical modulator, in which a top plan view of the uncovered optical modulator is shown.

FIGS. 2A through 2C show schematic configuration diagrams of electrooptic effect element 2.

DETAILED DESCRIPTION OF THE PREFERRED EMBODIMENTS

The preferred embodiment of the present invention is described herein after referring to the charts and drawings.

Figure 4:
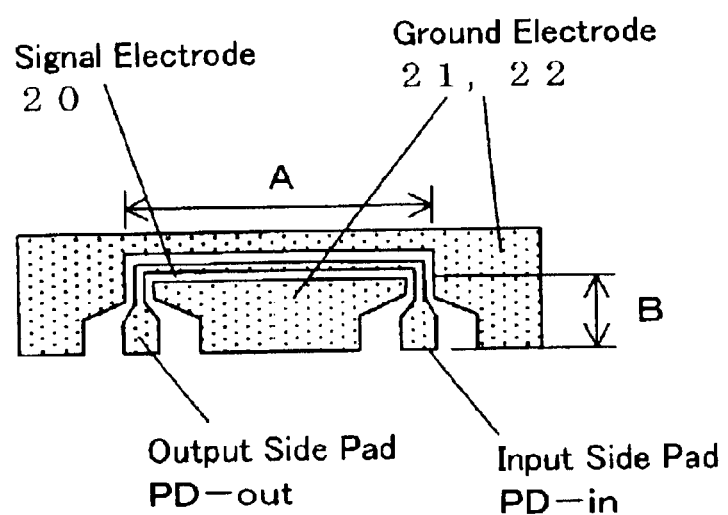
FIG. 4 shows a diagram in which only electrode pattern is extracted from FIG. 1.

FIG. 4 shows a diagram in which only electrode pattern is extracted from FIG. 1.

There are provided a signal electrode 20 and ground electrodes 21, 22 located on both sides of signal electrode 20, an interaction portion A which includes signal electrode 20 and ground electrodes 21, 22 mutually disposed in parallel, and an extraction portion B extended so as to connect signal electrode 20 and ground electrodes 21, 22 with external electrodes. Further, in this extraction portion B, an input side pad (PAD-in) and an output side pad (PAD-out) are provided to enable bonding connection with the external electrodes.

Figure 5A:
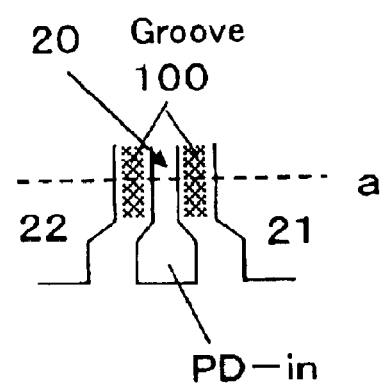
FIGS. 5A and 5B show the feature of the present invention, in which an enlarged diagram of the extraction portion is shown.
Figure 5B:
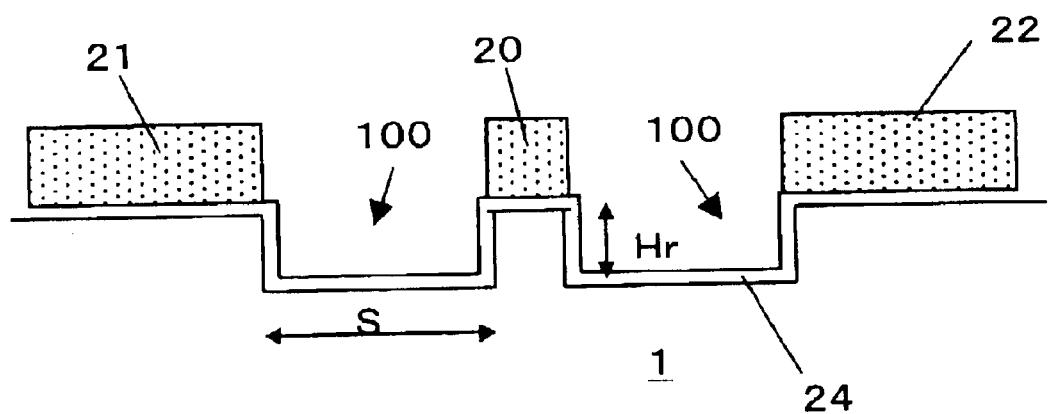

FIGS. 5A and 5B show the feature of the present invention, in which an enlarged diagram of the above-mentioned extraction portion B is shown.

In extraction portion B shown in FIG. 5A, a groove 100 is formed between signal electrode 20 and ground electrodes 21, 22. FIG. 5B is a cross-sectional view along broken line 'a' shown in FIG. 5A.

This groove 100 can easily be formed through the etching process after patterning.

A buffer layer 24 is formed on a substrate 1. Signal electrode 20 and ground electrodes 21, 22 are formed on buffer layer 24. A gap S is formed between signal electrode 20 and ground electrode 21, as well as between signal electrode 20 and ground electrode 22. Groove 100 has a depth of Hr.

With this configuration feature of the present invention, it becomes possible to decrease the coupling between the radiation of a high-frequency microwave signal and the electric field produced between signal electrode 20 and ground electrodes 21, 22. This is shown in FIGS. 6A, 6B in which the conventional configuration and the configuration of the present invention are respectively shown in contrast.

Figure 6A:
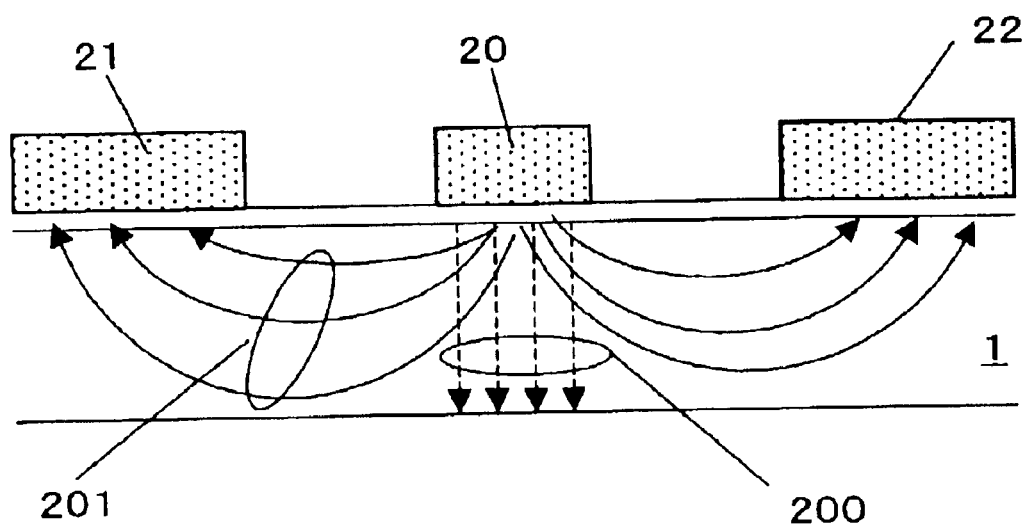
FIGS. 6A and 6B show diagrams of the conventional configuration and the configuration according to the present invention, respectively, for the sake of comparison.

More specifically, FIG. 6A shows coupling state between radiation 200 caused by a high-frequency microwave signal and electric field 201 generated between signal electrode 20 and ground electrodes 21, 22 in the conventional configuration. In this conventional configuration, no groove is provided between signal electrode 20 and ground electrodes 21, 22.

Figure 6B:
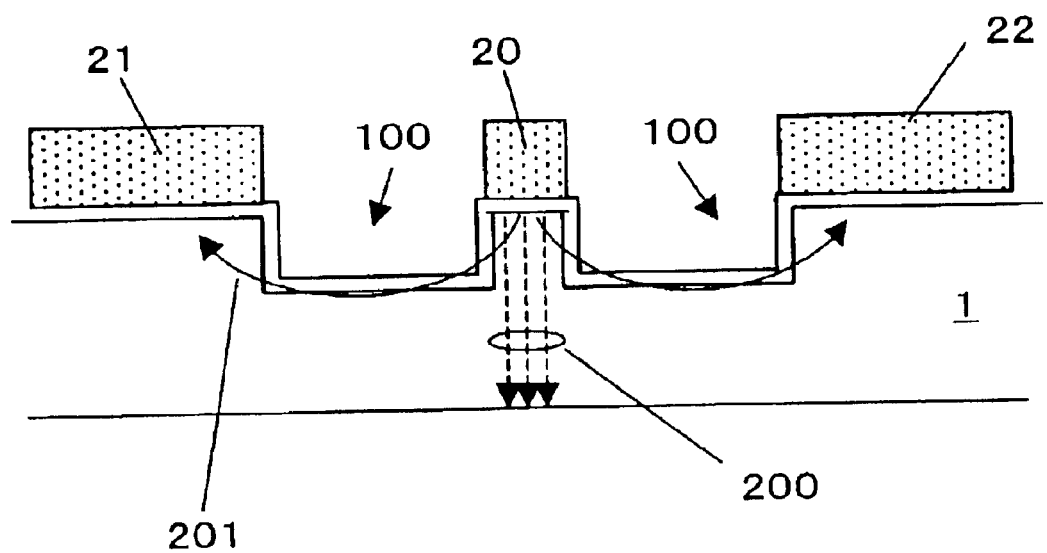

In contrast, as shown in FIG. 6B, because groove 100 is formed in the extraction portion according to the feature of the present invention, diffusion of electric field between signal electrode 20 and ground electrodes 21, 22 is decreased. This results in decreased coupling of radiation 200 of the high-frequency signal with electric field 201 between signal electrode 20 and ground electrodes 21, 22.

Figure 7:
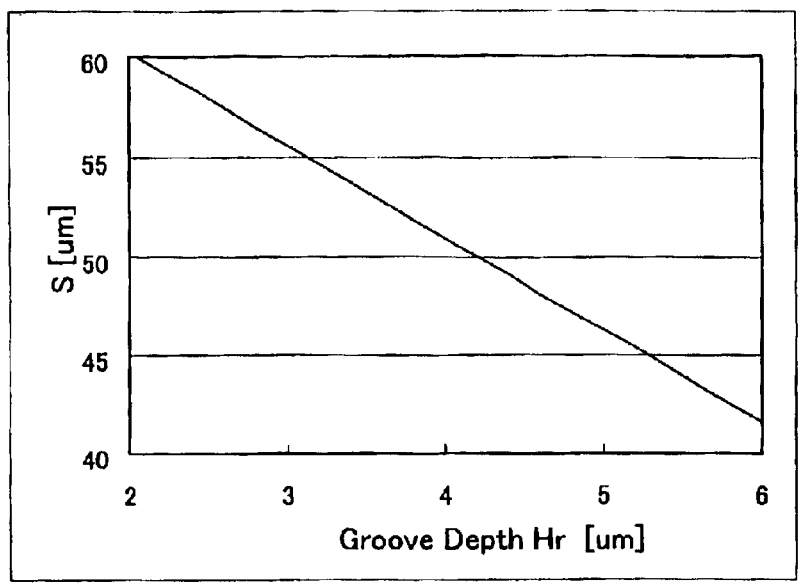
FIG. 7 shows a chart illustrating the relation between gap amount S ($\mu$m) of a groove produced between signal electrode 20 and ground electrodes 21, 22 and groove depth Hr ($\mu$m) shown in FIG. 5B, when the matching condition of characteristic impedance 50 $\Omega$ is maintained.

FIG. 7 shows a chart illustrating the relation between gap amount S (μm) between signal electrode 20 and ground electrodes 21, 22 and groove depth Hr (μm) shown in FIG. 5B when the matching condition of the characteristic impedance of 50 Ω is maintained.

It is to be understood from this chart that, even when gap S (μm) is set as 60 μm or narrower, the matching condition of characteristic impedance 50 Ω can be maintained by increasing groove depth Hr (μm).

Figure 3:
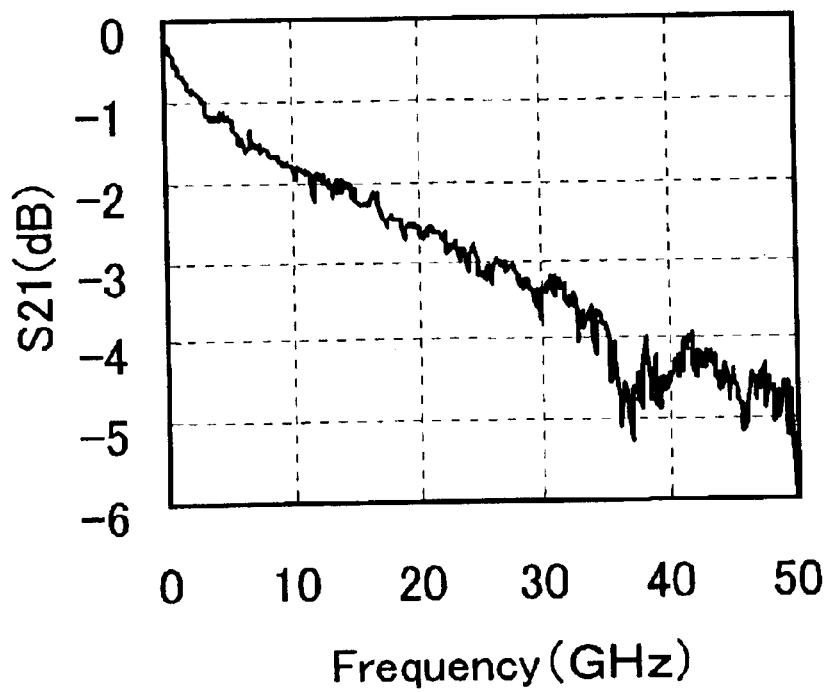
FIG. 3 shows a high frequency characteristic of the conventional optical modulator.
Figure 8:
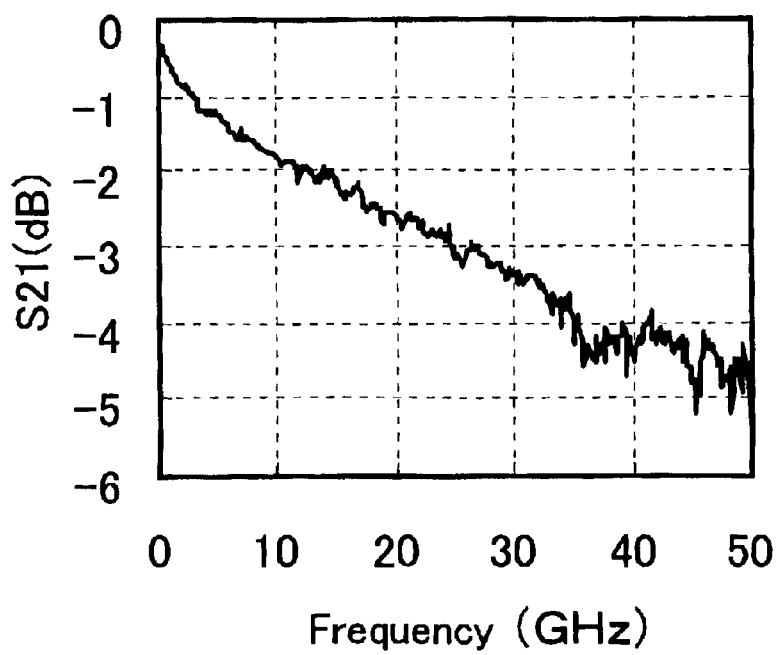
FIG. 8 shows a wideband characteristic of the optical modulator in which the present invention is applied.

As a result, as shown in FIG. 8 in contrast to FIG. 3, the attenuation dip in high frequency region is eliminated, and thus wideband characteristic of the optical modulator can be achieved.

Figure 9A:
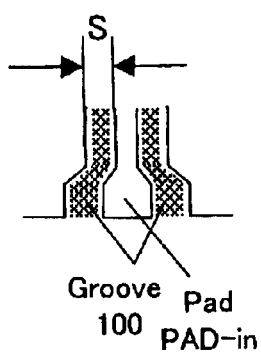
FIGS. 9A through 9C show diagrams illustrating variation examples of the shape of groove 100.
Figure 9B:
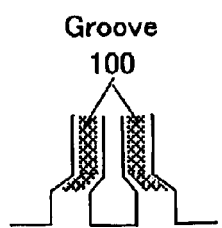
Figure 9C:
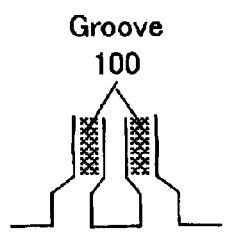

FIGS. 9A through 9C show diagrams illustrating variation examples in regard to the shape of groove 100.

FIG. 9A is an example in which groove 100 is formed so as to include the pad PAD-in provided for connecting with the external electrode formed in the extraction portion of signal electrode 20 and ground electrodes 21, 22.

FIG. 9C is an example similar to the example shown in FIG. 5A. In FIG. 9C, groove 100 is formed in an area in which signal electrode 20 and ground electrodes 21, 22 are disposed in parallel in the extraction portion. In the example shown in FIG. 9B, the groove is formed in an intermediate manner between FIGS. 9A and 9C. Namely, groove 100 is formed in the extraction area only excluding the pad PAD-in area.

In any forms of the groove shown in FIGS. 9A–9C, the attenuation dip is not produced, and wideband characteristic can be achieved.

As the embodiments of the present invention have been described according to the drawings, by providing a groove between the signal electrode and the ground electrodes instead of increasing the gap between the signal electrode and the ground electrodes, the desired characteristic impedance can be obtained.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical modulator comprising:

a substrate having the electrooptic effect;

an optical waveguide formed on a surface of the substrate; and a signal electrode and a ground electrode formed in the vicinity of the optical waveguide, wherein the signal electrode and the ground electrode include an interaction portion and an extraction portion, and a groove is formed between the signal electrode and the ground electrode located in the extraction portion area.

2. The optical modulator according to claim 1, wherein the extraction portion has a pad connecting to an electrode of an RF connector through which a high frequency signal is supplied, and the groove formed between the signal electrode and the ground electrode located in the extraction portion area is formed in the extraction portion area excluding the pad.

3. The optical modulator according to claim 2, wherein the groove is formed between the signal electrode and the ground electrode located only in the extraction portion area of the input side of the optical waveguide.

4. The optical modulator according to claim 2, wherein a gap between the signal electrode and the ground electrode located in the extraction area excluding the pad is set as 60 μm or narrower.

5. The optical modulator according to claim 1, wherein the groove is formed between the signal electrode and the ground electrode located only in the extraction portion area of the input side of the optical waveguide.

* * * * *